United States Patent [19]

Roller

[11] 3,964,510
[45] June 22, 1976

[54] LIVE WELL VALVE

[75] Inventor: William G. Roller, Purdy, Mo.

[73] Assignee: G & R Industries, Inc., Purdy, Mo.

[22] Filed: Nov. 25, 1974

[21] Appl. No.: 526,705

[52] U.S. Cl.............................. 137/528; 137/DIG. 2; 137/533.11; 251/82; 251/251
[51] Int. Cl.² .................... F16K 31/52; F16K 15/04
[58] Field of Search................... 251/82, DIG. 2, 83, 251/251; 137/522, 523, 528, 533.11

[56] References Cited
UNITED STATES PATENTS

| | | | |
|---|---|---|---|
| 452,678 | 5/1891 | McFarlane et al.............. | 137/522 X |
| 1,196,862 | 9/1916 | Hayes................................ | 137/523 |
| 1,225,238 | 5/1917 | Gray.............................. | 137/DIG. 2 |

FOREIGN PATENTS OR APPLICATIONS

| | | | |
|---|---|---|---|
| 70,641 | 12/1958 | France................................. | 251/82 |

Primary Examiner—Arnold Rosenthal
Attorney, Agent, or Firm—Dunlap, Codding & McCarthy

[57] ABSTRACT

A live well valve apparatus having a valve body forming a ball member compartment and a stab joint conduit with flowthrough communication therebetween. A ball member is disposed in the ball compartment and positionable in moving clearance and in sealing engagement with a valve seat disposed between the ball member compartment and the stab joint conduit. A wedge means is provided to selectively force the ball member in sealing engagement with the valve seat, the wedge assembly in the preferred embodiment being an actuator bar slidingly supported on the valve body in opposingly aligned bar supporting grooves, the actuator bar having a clearance end and a wedge end.

5 Claims, 4 Drawing Figures

U.S. Patent   June 22, 1976   3,964,510
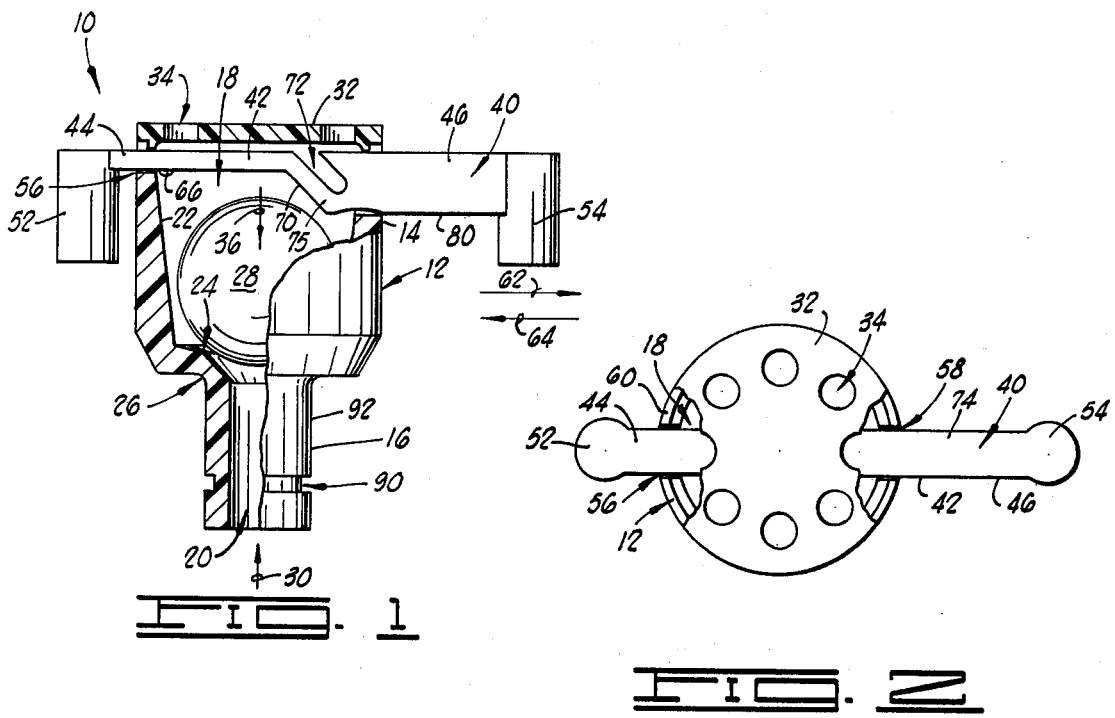
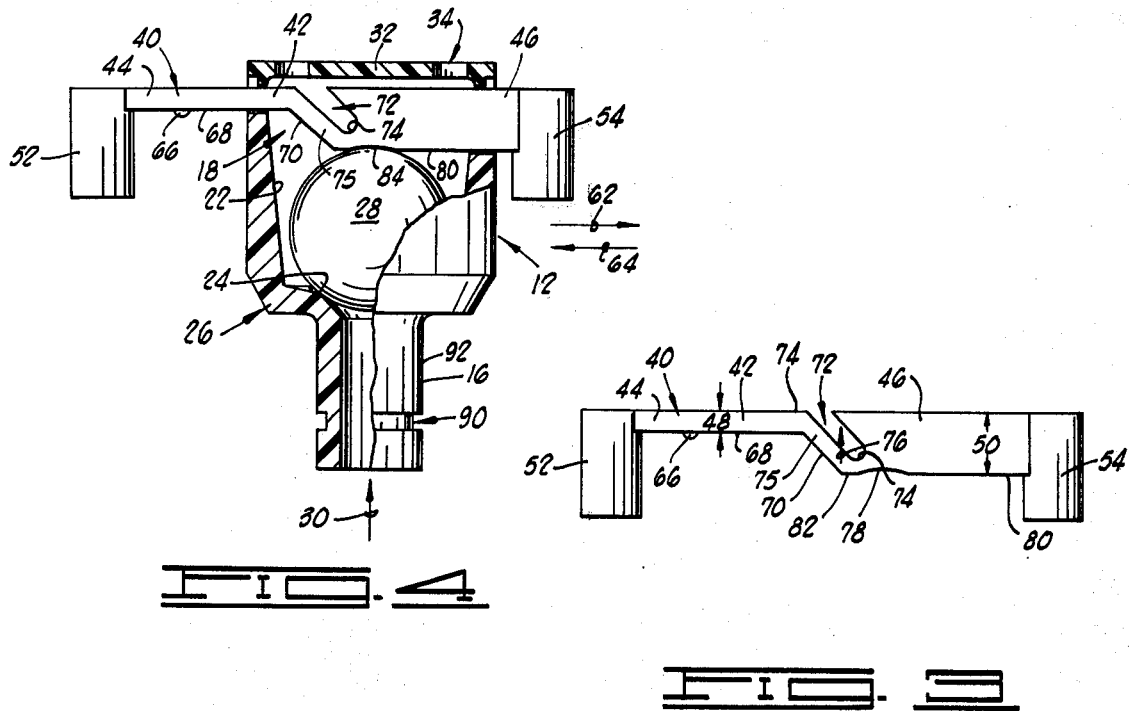

LIVE WELL VALVE

BACKGROUND OF THE INVENTION

1. Field of Invention

The present invention relates generally to valves, and more particularly but not by way of limitation, to the type of valves designed to permit flowthrough in one direction only.

2. Description of Prior Art

There have been many designs of valves which restrict flowthrough to one direction only, such valves commonly referred to as check valves. That is, the valves check the flow in the blocking direction.

In the field of fishing, particularly considering tournament bass fishing, the captured fish are placed in a small tank formed in the boat, this tank commonly referred to as a live well. Water flows through a supply aperture to fill the live well for the placement therein of the day's catch of fish.

A problem arising in the use of live wells, especially in tournament fishing, is that there often is need to move the boat rapidly to another location, and as the boat is propelled rapidly over the water, high speed planing causes water to be sucked out of the live well through the supply aperture. That is, the velocity of water over the supply aperture causes a pressure drop across the supply aperture, resulting in water drainage from the live well. The result of this often is the unfortunate killing of the fish in the live well.

One solution to this is the utilization of a check valve placed in the supply aperture to prevent the inadvertent drainage of the live well assembly of a boat.

SUMMARY OF THE PRESENT INVENTION

Accordingly, one object of the present invention is to provide an improved check valve to prevent the inadvertent draining of a live well.

Another object of the present invention is to provide an improved check valve capable of being positioned in the supply aperture of a live well of a boat.

Another object of the present invention is to provide a check valve capable of being positionable in various sizes of supply apertures in live wells of various boats.

Another object of the present invention is to provide a check valve having the capability of serving as a stopcock in a supply aperture of a live well of a boat while providing ease of operation.

Another object of the present invention is to provide a check valve of simplified design that offers economy of manufacture.

BRIEF DESCRIPTION OF THE DRAWINGS

FIG. 1 shows a partial cutaway, side elevational view of a live well valve made in accordance with the present invention.

FIG. 2 is a partial cutaway top view of the live well valve of FIG. 1.

FIG. 3 is a side view of the actuator bar member of the live well valve of FIG. 1.

FIG. 4 is a partial cutaway, side elevational view of the live well valve of FIG. 1 with the actuator bar forcing the ball member in sealing engagement with the valve seat.

DESCRIPTION OF THE PREFERRED EMBODIMENT

Referring to the drawings in general and particularly to FIG. 1, shown therein and generally designated by the numeral 10 is a live well valve apparatus made in accordance with the invention herein as shown in partial cutaway, side elevational view. The live well valve 10 is comprised of a unitary valve body 12 having a first end 14 and a second end 16. The first end 14 is cylindrically shaped and provides a ball member compartment 18, while the second end 16 is formed in the shape of a hollow pipe or conduit having flowthrough communication with the ball member compartment 18 via the bore 20 extending through the center of the conduit 16.

In the preferred form, the valve body 12 is a unitary member that is integrally formed from a moldable polymeric material suitable for water service. The inner wall 22 of valve body 12 forms a valve seat 24 intermediate to the first end 12 and the second end 16 of the valve body 12. That is, the valve seat 24 is disposed in the ball member compartment 18 generally at the juncture 26 of the conduit 16 and the first end 14 of the valve body 12. While the valve seat 24 is shown as a unitary portion of the valve body 12, it will be understood that the valve seat 24 may be fashioned as a separate member and attached to the valve body 12 by conventional attaching means. Depending upon the selected material for construction of the valve body 12, the valve seat 24 may require polishing or the like to effect a smooth and symmetrical seat for the sealing member which will now be described.

A ball member 28 is disposed in the ball member compartment 18, the diameter of the ball member 28 being selected such that the ball member 28 is retainable upon the valve seat 24 while having clearance with the inner wall 22. The inner wall 22 of the valve body 12 is sloped upwardly toward the valve seat 24 as shown in FIG. 1 to provide fluid clearance around the ball member 28. The diameter of the ball member 28 and the length of the ball member compartment 18 are predetermined such that the ball member 28 can be lifted by fluid passing in the direction 30 to a clearing position relative to the valve seat 24. The ball member 28 is retained in the ball member compartment 18 by a screen 32 that is placed transversely over the open end of the first end 14 of the valve body 12. In preferred form, the screen 32 is a disk shaped member having a plurality of apertures 34 extending through screen 32 and positioned peripherially about the screen 32. The apertures 34 have fluid communication with the ball member compartment 18, there being flowthrough fluid communication in the direction 30 via fluid entering bore 20 of the conduit 16, passing over the valve seat 24 and between the ball member 28, through the ball member compartment 18 and out the apertures 34. The diameter of the apertures 34 is not a critical consideration of the present invention, but the proper selection of the diameter permits the flowthrough fluid communication required of the live well valve 10 while serving to screen unwanted debris from entering the live well. Of course, an unduly amount of debris could interfere with the operation of the valve 10, and should screening of the flowthrough fluid become a major consideration, it will be understood that additional screening may be required. If such be the case, conventional methods of filtering the flowthrough fluid can be utilized in cooperation with the live well valve of the present invention.

The live well valve 10 as described to this point in this disclosure is functionally able to serve as a check valve as is well known in the valve art. That is, the ball member 28 is capable of being placed in sealing engagement with the valve seat 28 by the application of a force in the direction 36 such that the ball member 28 is caused to be forced against the valve seat 24. The ball member 28 is a spherically shaped member, and the valve seat 24 is shaped to evenly contact at least the arc of a circle defined by a plane passing through the ball member 28 and containing the valve seat 24 simultaneously. The quality and integrity of the seal effectuated by the ball member 28 and the valve seat 24 will depend not only upon the amount of force in the vector direction 36, but as well as upon the mating quality of the surfaces of the ball member 28 and the valve seat 24. As is well known in the art of molding polymeric materials, molded surfaces may not achieve the degree of symmetry required for the valve seat 24, depending upon the quality of the mold in which the valve body 12 is cast. It may be necessary to machine polish the valve seat 24 if the live well valve 10 is to be used in critical applications. However, generally good sealing integrity has been encountered by simply carefully detailing the mold in the area that will form the valve seat 24, and by the use of a ball member 28 that is substantially spherical, the efficacy of the sealing members depending in large part upon the quality then of the mating surfaces during the engagement of the ball member 28 with the valve seat 24.

The ball member 28 in conjunction with the valve body 12 serves as a check valve that permits fluid flowing in the direction 30 to pass essentially unimpaired through the bore 20 and the ball member compartment 18. On the other hand, fluid that attempts to flow by differential pressure in the direction 36 will exert pressure on a greater area of the ball member 28 than is encountered by the fluid in the bore 20. Therefore, the ball member 28 will be caused to move in the direction 36 to be brought into sealing engagement with the valve seat 24.

Continuing with a description of the construction of the live well valve 10, an actuator bar 40 is supported on the valve body 12 and is positioned between the ball member 28 and the retaining screen member 32. The actuator bar serves as a wedge means to mechanically move the ball member 28 in a first position wherein the ball member has clearing engagement with the actuator bar 40, and in a second position wherein the ball member 28 is retained in sealing engagement with the valve seat 24.

The actuator bar 40 comprises an elongate member 42 having a first end 44 and a second end 46. The first end 44 of the elongate member 42 has a thickness dimension 48, and the second end 46 has a thickness dimension 50. A knob member 52 is connected to the first end 44, and a knob 54 is connected to the second end 46 of the elongate member 42. The actuator bar 40 is supported on the valve body 12 by a pair of opposingly aligned bar supporting grooves 56 and 58 that are disposed in the upper portion of the first end 14 of the valve body 12 so as to diametrally position the actuator bar 40 relative to the ball member compartment 18 as may be best viewed in FIG. 2. The depth of the grooves 56 and 58 from the top edge 60 of the valve body 12 is predetermined such that the actuator bar 40 is slidingly retained in the first and second grooves 56 and 58 once the retaining screen member 32 is secured to the top edge 60 of the valve body 12. That is, the actuator bar 40 is slidable in a direction indicated by the arrow 62 and in a direction indicated by the arrow 64, the direction 64 being opposite to the direction 62. By the application of hand pressure on the knobs 52 and 54, the actuator bar 40 is positionable in a first position, as shown in FIG. 1, wherein the actuator bar 40 is moved in the direction 62. In like manner, the actuator bar 40 is positionable in a second position, as shown in FIG. 4, wherein the knobs 52 and 54 are used to hand press the actuator bar 40 in the direction 64.

The thickness dimension 48 is selected to slidingly clear the surfaces of the first groove 56 and the retaining screen 32. A retaining means in the form of a tab 66 protrudes from the under surface 68 of the first end 44 of the elongate member 42 of the actuator bar 40. The tab 66 is in the form of a dimple that is formed in the surface 68. The preferred manner of constructing the actuator bar 40 is by molding the actuator bar 40 of the same polymeric material as that of the valve body 12, and if this be the case, the tab 66 may be provided as a protruding dimple from the surface 68. The thickness dimension 48 and the thickness dimension of the tab 66 are predetermined such that the combined thickness of the first end 44 and the tab 66 are passable through the opening formed by the first groove 56 and the under surface of the retaining screen 32 by the application of additional pressure than is required to slide the first end 44 along the groove 56 at other portions of the surface 68. That is, the tab 66 is selected to be slightly deformable so that the tab 66 is passable through the first groove 56 by the application of hand pressure. The tab 66 is positioned a predetermined distance from the knob 52 such that the actuator bar 40 is retained in the position shown in FIG. 1 when moved in the direction 62. On the other hand, once the actuator bar 40 has been moved in the direction 64 and the tab 66 has been forced passed the bar supporting groove 56, the actuator bar 40 is positionable as shown in FIG. 4.

The thickness dimension 50 of the actuator bar 40 is predetermined together with the selected diameter of the ball member 28 to wedge the ball member 28 against the valve seat 24 in the manner shown in FIG. 4. The elongate member 42 necks down at the ramp surface 70 from the thickness dimension 50 to the thickness dimension 48, the surface 70 being removed angularly from the surface 68 by approximately 45°. A notch 72 is disposed in the top surface 74 of the elongate member 42 and extends into the second end 46 such that the sides of the notch 72 are generally parallel with the ramp surface 70. The purpose of the notch 72 is to reduce the thickness of the second end 46 to form a spring webb 74 such that the connecting portion 75, that connects the first end 44 and the second end 46, may be flexed generally in the direction 76. A bar retaining seat 78 is formed in the ball member engage side 80 of the second end 46 near the leading edge 82 that adjoins the ramp surface 70, the leading edge 82 being partially relieved and rounded for the purpose that will now be explained.

The thickness dimension 50, as stated above, is selected such that the second end 46 of the actuator bar 40 will not clear the ball member 28, but will serve to wedge the ball member 28 against the valve seat 24. The actuator bar 40 is thus designed such that the first end 44 of the elongate member 42 serves as a clearance end to the ball member 28, while the second end 46 of the elongate member 42 serves as wedge end for forcing the ball member 28 into sealing engagement with the valve seat 24. In operation, when the actuator bar 40 is in the first position as shown in FIG. 1, the pressure fluid flowing through the live well valve 10 in the direction 30 moves the ball member 28 into clearing relation to the valve seat 24. As the actuator bar 40 is slided in the direction 64, the ramp surface 70 is brought against the ball member 28 and the ball member 28 is moved in the direction 36. As the ball member 28 is brought into contact with the valve seat 24, the dimensions of the actuator bar 40 are predetermined such that the leading edge 82 is forced against the ball member 28 and continued force on the actuator bar 40 in the direction 64 will cause the deformation of the connecting portion 75 in the direction 76 to permit the leading edge 82 to clear the top of the ball member 28. Once the leading edge 82 has crested over the topmost point 84 on the surface of the ball member 28, the bar retaining seat 78 provides relief to the crest 84 of the bar member 28, and the leading edge 82 is permitted to partially return to its normal position while the ball member 28 is wedged between the bar retaining seat 78 and the valve seat 24. The bar retaining seat 78 serves to maintain wedging pressure on the ball member 28 while retaining the actuator bar 40 in the second position as shown in FIG. 4.

The live well valve 10 as above described may be inserted into the supply and drainage opening of the live well provided in many fishing boats. The second end 16 of the valve body 12 serves as a connecting conduit for the live well valve. That is, the end 16 is shaped to form a stab joint which can be disposed in drainage apertures that communicate with a live well and the lake or other body of water upon which the boat is floating. An O-ring groove 90 is provided and extends into and about the outer surface 92 of the end 16 of the valve body 12. A conventional O-ring is disposed in the O-ring groove 90 and is deformable so as to form a fluid seal when the end 16 is stabbed or disposed into the live well drainage aperture. This O-ring arrangement permits the insertion of the conduit end 16 in various sizes of supply apertures, with the dimensions of the O-ring groove 90 and the selected O-ring being usable over a range of hole sizes.

In the use of the live well 10, the operation of the live well as a check valve to permit fluid flowing in the direction 30 but not in the opposite direction has been made clear by the disclosure hereinabove. The actuator bar 40 when positioned in the first position depicted in FIG. 1, the live well valve 10 is operative as a unidirectional flowthrough check valve. On the other hand, when the actuator bar 40 is positioned in the second direction depicted in FIG. 4, the live well valve serves as a stopcock for the drainage aperture of a live well. This permits the boat operator to place the live well valve 10 into its best mode of operation for the particular circumstances at hand. When the boat is being propelled over the surface of the lake, the actuator bar 40 may remain in the first position, that is the clearance position as depicted by FIG. 1, and water loss to the live well, caused by high speed planing as water is caused to flow pass the draining aperture at high velocities, will be prevented automatically. If the operator prefers, actuator bar 40 may be engaged in the manner described above to provide a positive locking of the ball member 28 against valve seat 24, thereby assuring sealing integrity. That is, debris or the like will not be able to prevent good sealing contact between the ball member 28 and the valve seat 24. In this manner, the prize catch of a fishing tournament will not be lost due to inadvertent draining.

It is clear that the above described live well valve is capable of meeting the above stated objects, and it is also clear that changes may be made in the construction and the arrangement of the parts or the elements of the embodiment without departing from the spirit and scope of the invention as described in the following claims.

What is claimed is:
1. A live well valve apparatus, comprising:
a valve body having a first end forming a ball member compartment and a second end forming a stab joint conduit, there being flowthrough communication between the first and second ends, the valve body having a pair of opposingly aligned bar supporting grooves, consisting of a first groove and second groove;
a valve seat on the valve body and disposed between the ball compartment and the conduit;
a ball member disposed in the ball member compartment;
wedge means for selectively forcing the ball member in sealing engagement with the valve seat, the wedge means comprising an actuator bar having a clearance end and a wedge end, the clearance end of the actuator bar slidingly supported in the first groove, and the wedge end slidingly supported in the second groove, the actuator bar being supported transversely to the valve body, the ball member being disposed between the actuator bar and the valve seat, and the actuator bar being positionable in a first position wherein the ball member has moving clearance and positionable in a second position wherein the ball member is forced thereby in sealing engagement with valve seat; and,
retaining means for selectively retaining the actuator bar in the first position or the second position, the retaining means characterized as comprising: tab means protruding from the actuator bar clearance end and cooperating with the first groove for retaining the actuator bar in the first actuator bar position; and,
bar retaining seat means on the actuator bar for retaining the actuator bar in the second actuator bar position.

2. The apparatus of claim 1 further comprising: a retaining screen supported on the valve body across the first end.

3. The apparatus of claim 2 wherein the conduit end of the valve body forming the stab joint has an O-ring retaining groove extending around the outer surface of conduit.

4. The apparatus of claim 3 wherein the valve body and valve seat are integrally formed from a polymeric material.

5. In a valve comprised of a valve body having ball member compartment, a valve seat, a ball member and a connecting conduit, the improvement comprising:
an actuator bar positionable in a first position wherein the ball member has moving clearance and positionable in a second position wherein the ball member is forced thereby in sealing engagement with the valve seat, the actuator bar slidingly supported in opposingly aligned grooves in the valve body, the actuator bar characterized as having:

a clearance end;

a wedge end having a ball member engage side and a notch in the opposite side;

tab means protruding from the actuator bar clearance end and cooperating with the one of the grooves for retaining the actuator bar in the first actuator bar position; and, the actuator bar has a retaining seat formed in the ball member engage side generally opposite the notch in the opposite side.

* * * * *